Patented June 19, 1951

2,557,359

UNITED STATES PATENT OFFICE 2,557,359

SHOCK-RESISTANT CONDENSER-TYPE INSULATING BUSHING

Humphreys Milliken, Mount Royal, Quebec, Canada

Application November 14, 1945, Serial No. 628,513

6 Claims. (Cl. 174—31)

The invention relates to improvements in insulating conduits as described in the present specification and illustrated in the accompanying drawings that form a part of the same.

The invention consists essentially of the novel features of construction as pointed out broadly and specifically in the claims for novelty following a description containing an explanation in detail of acceptable forms of the invention.

To devise a means for using porcelain in a blast conduit in such a manner that the porcelain is not subjected to tension; to construct a blast conduit that can be safely used as a support for the interrupter of the circuit breaker, thereby eliminating the usual separate stacks of insulators; to reduce the possibilities of flashovers in the conduits caused through the penetration of moisture into the interior of the conduit as a continuous internal wet path from top to bottom of the conduit would cause an internal flashover from top to bottom of the conduit, bursting it, the explosive force of the internal pressure projecting the fragments of porcelain outward with danger to persons and property; to minimize the danger of cracking the vitreous material due to sudden large drop in temperature, as by cold rain after hot sun or from other causes; and generally to provide an insulating conduit that will be durable in construction and efficient for its purpose.

In the drawings.

Like numerals of reference indicate corresponding parts in the various figures.

Figure 1:
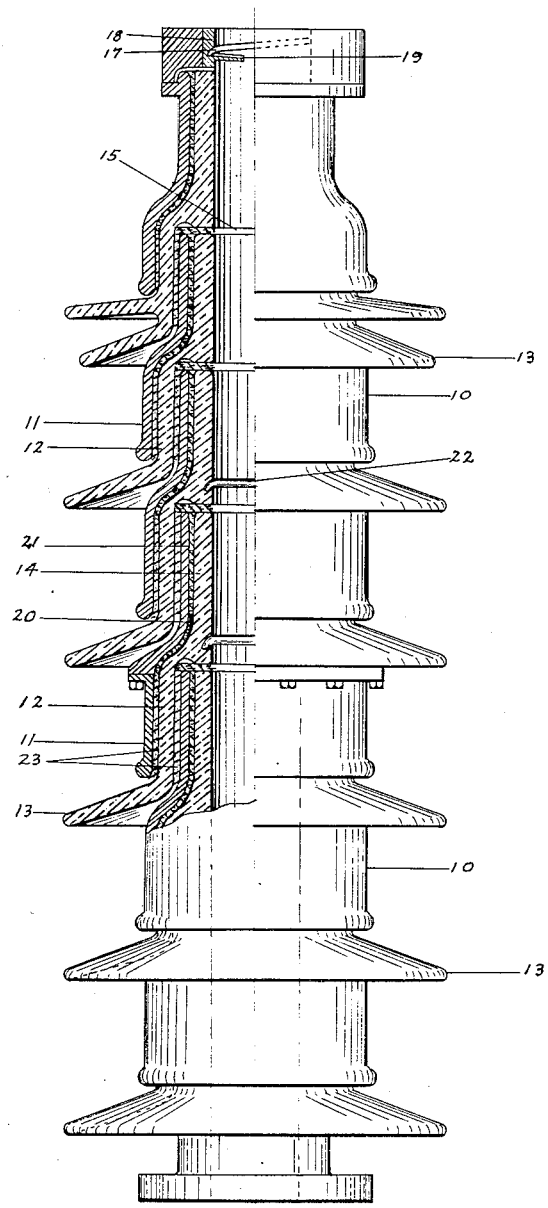
Figure 1 is a fragmentary longitudinal view partially in section of the insulating conduit.
Figure 2:
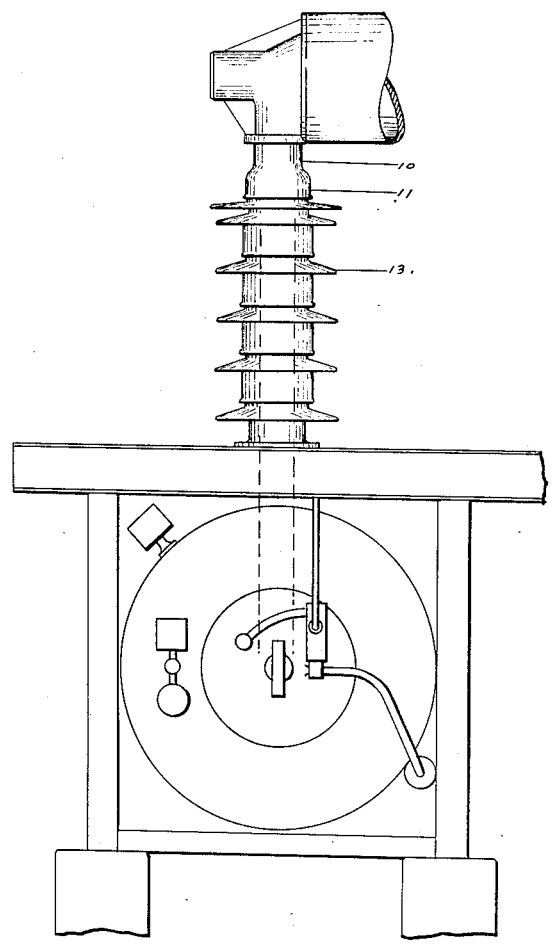
Figure 2 is a fragmentary side view of a circuit breaker illustrating the application of the insulating conduit thereto.
Figure 3:
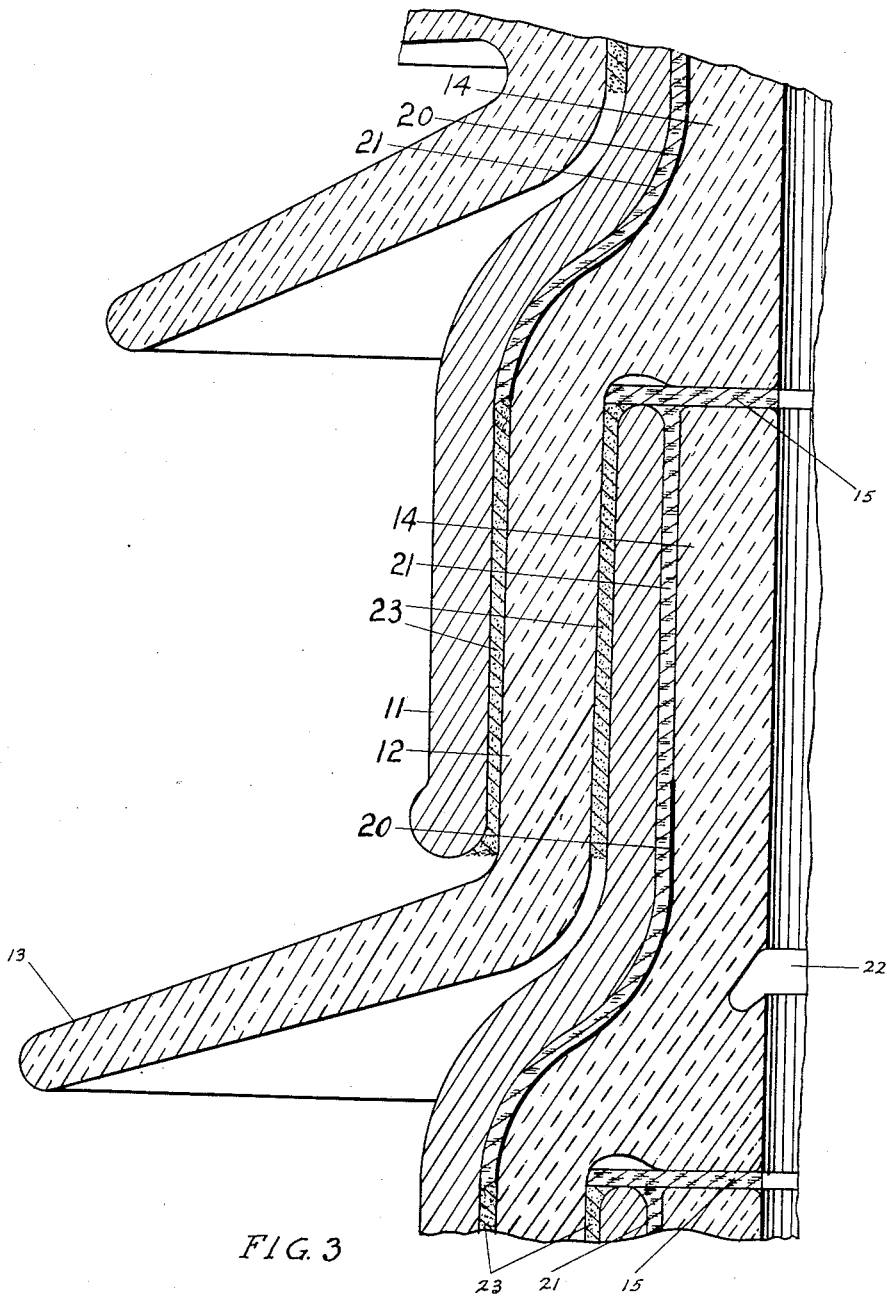
Figure 3 is an enlarged fragmentary sectional view of the insulating conduit.

Referring to the drawings, the insulating conduit is composed of a plurality of tubular metallic sections, as indicated by the numeral 10, and each section is provided with one end 11 of relatively large diameter and its other end of smaller diameter.

The tubular sections interengage with one another with the smaller end of one tubular section located concentrically inside the large end of the adjacent metallic section and leaving an annular space between the two metallic sections.

An insulator 12 made of porcelain or other vitreous material is introduced in the space provided between the adjacent sections and is cemented at 23 or otherwise secured internally and externally to the small and large ends respectively of the adjacent metallic tubular sections. The insulator is thus confined between the inner and outer metallic tubes and bending forces applied to the conduit as a whole exert only forces of compression on the insulator. External forces of tension or compression along the axis of the conduit, exert only shearing forces on the insulator. The porcelain is highly dependable to resist shearing or compression.

Each of the insulators has an external conical extension or skirt 13 and is constructed with an internal cylindrical extension 14, the latter being so proportioned as to provide sufficient resistance to flash-over for the voltage of the circuit. In order to exclude moisture from the interior of the conduit a gasket 15 is provided between the abutting ends of the adjacent insulators and the insulator surfaces are ground accurately flat for that purpose. In this way water is prevented from entering through the joints.

In order to prevent water from entering through the interrupter and running down the interior surface of the conduit, means are provided for causing such water to drop clear to the bottom of the conduit and not run down the interior surface. An acceptable form is in providing the upper end of the conduit with a circular channel 17 in the interior surface of a metallic collar 18, with a small spout 19 which drains the water from the channel and is inclined downwards and away from the surface of the insulator.

Water in such equipment is usually the result of condensation from damp air and the ultimate quantity of such condensation will never be so great as to fill up the conduit.

The conduit may also be slightly inclined from the vertical so that the spout need not be long enough to reach the axis of the conduit and yet the drop of water will fall clear of the surface and strike the bottom of the conduit near its axis.

The overlapping metal tubes separated by the insulator constitute a series of electrostatic condensers. The potential across each porcelain insulator will be determined by the capacitance of the condenser which will be determined by the area of the metallic surfaces or opposite sides of each insulator, by effective thickness of the insulation between the metallic surfaces, and by the position of the insulator in the conduit, the potential being a maximum across the top insulator. It is desirable to have all of the insulators of the same shape and size for economy of manufacture. However that results in a minimum of electric safety factor across the top insulator, the lower insulators being stressed far below their dielectric strength, thus wasting material. Hence the dielectric strength of the complete conduit would be substantially increased if the total potential from top to bottom could be divided more equally across the several insulators.

Such desirable result can be accomplished to a considerable extent by grading the capacitance, with the maximum capacitance at the top. Portland cement is of a relatively low electric resistance hence it acts as a conductor in distributing the potential over the surface of the insulator, the effective separation of the "plates" of the condenser being the thickness of the porcelain or other vitreous insulator between the cement on each side thereof.

Above the cemented surface, however, the air space between the insulator and the metal tubes, would add to the effective separation of the "plates" of the condenser in this portion.

In order to increase the capacitance across the upper porcelain insulation, a conducting coating 20 is applied to the outer surface of the porcelain above the cemented surface, this conducting coating being in contact with the metal tube, this reduces the effective separation of the condenser "plates" to the extent of the thickness of the air space. The conducting coating also adds to the effective area of the condenser "plate," both effects add to the capacitances of the condenser and decreases the potential across the upper porcelain insulator. On the insulators below the top, the conducting coating is progressively shortened in order to accomplish the desired grading of capacitance and potential.

The space for cement or other equivalent material is made as thin as possible in order to minimize the effect of shrinkage of the cement as it sets, to facilitate filling the narrow space with cement, a vacuum may be applied to remove all air bubbles or voids, after which the vacuum is released and the atmospheric pressure forces the liquid cement into all crevices. The cementing is done in two steps: a felt spacer 21 is fastened around the upper end of the porcelain. The metal tube is placed over the felt fitting tightly. The assembly (one insulator and one metal tube) is turned upside down; liquid neat cement is poured into the space; vacuum is applied, then released. When the cement has set, the top assembly is turned upside down, the gasket placed in position, the next assembly placed inside the top assembly, pressed down and held against gasket while cement is poured and left to set, using vacuum while pouring cement.

Any one of each of the metal tubes may be made in two sections bolted together as shown, in order to assemble complete conduits of different lengths for different voltages.

A groove 22 may be provided in the interior of the porcelain insulator at its thickest section as shown, to accomplish two purposes (a) to increase the creepage surface at a point of maximum potential gradient (due to the gap between the two adjacent metal tubes) along the interior surface of the porcelain, and (b) to catch whatever few drops of water might condense from damp air in the conduit and run down the surface, thus preventing a continuous wet path and a resulting flashover from top to bottom of conduit.

The cross section of the groove is inclined upward and inward, its lower edge being relatively sharp and its upper edge being rounded. This cross sectional shape minimizes turbulence of the outer layer of the air stream and resulting pneumatic friction and loss of pressure. This shape also creates a suction effect in the groove minimizing the expenditure of compressed air to compress the air in the grooves.

Glass may be used instead of porcelain, for such conduits, in which case, the cementing would be eliminated. The melting temperature of glass being lower than that of iron, the metal tubes can be held in position in the mould and the molten glass cast around the metal tubes which may thereby be completely enclosed by the glass.

Likewise, plastic insulation might be used, for certain conditions of service, instead of Portland cement.

What I claim is:

1. An insulating conduit of tubular formation for conveying compressed gas and having an inlet end and an outlet end, electrical insulation between said ends, said insulation comprising a plurality of insulating tubes each having a relatively large diameter toward the inlet end and a relatively small diameter toward the outlet end, the large end of each of said tubes concentrically overlapping the smaller end of the adjacent tube with an annular space between the overlapping portions, a plurality of metallic tubes each having a relatively large diameter toward the inlet end and a relatively small diameter toward the outlet end, the large diameter of each of said metallic tubes being placed concentrically around the large portion of each of said insulating tubes and sealed thereto, the smaller portion of each of said metallic tubes being placed concentrically inside the larger portion of each of said insulating tubes and sealed thereto, each of said insulating tubes having an integral skirt of insulating material at its larger end and each of said insulating tubes being sealed to the adjacent metallic tubes only where the insulation lies between the overlapping portions of said metallic tubes.

2. An insulating conduit of tubular formation for conveying compressed gas and having an inlet end and an outlet end, electrical insulation between said ends, said insulation comprising a plurality of insulating tubes each having a relatively large diameter toward the inlet end and a relatively small diameter toward the outlet end, the large end of each of said tubes concentrically overlapping the smaller end of the adjacent tube with an annular space between the overlapping portions, a plurality of metallic tubes each having a relatively large diameter toward the inlet end and a relatively small diameter toward the outlet end, the large diameter of each of said metallic tubes being placed concentrically around the large portion of each of said insulating tubes and sealed thereto, the smaller portion of each of said metallic tubes being placed concentrically inside the larger portion of each of said insulating tubes and sealed thereto, each of said insulating tubes having an integral skirt of insulating material at its larger end, the internal diameter of the smaller portion of each of said insulating tubes being substantially constant, and accordingly the internal diameter thereof being substantially the same in all of said insulating tubes, thereby providing a tubular conduit of substantially uniform inside diameter throughout its length, and each of said insulating tubes at the inlet end of its smaller portion having a shoulder with a radial width approximately equal to the radial thickness of the insulator at its outlet end, and a gasket of resilient material placed between the shoulder and the end of the adjacent insulator, thereby preventing leakage of the compressed gas therein or entrance of moisture from outside.

3. An insulating conduit of tubular formation for conveying compressed gas and having an inlet end and an outlet end, electrical insulation between said ends, said insulation comprising a plurality of insulating tubes each having a relatively large diameter toward the inlet end and a relatively small diameter toward the outlet end, the large end of each of said tubes concentrically overlapping the smaller end of the adjacent tube with an annular space between the overlapping portions, a plurality of metallic tubes each having a relatively large diameter toward the inlet end and a relatively small diameter toward the outlet end, the large diameter of each of said metallic tubes being placed concentrically around the large portion of each of said insulating tubes and sealed thereto, the smaller portion of each of said metallic tubes being placed concentrically inside the larger portion of each of said insulating tubes and sealed thereto, each of said insulating tubes having an integral skirt at its larger end, and one or more of said metallic tubes having a separable bolted joint around its circumference at the outlet end of the portion which is sealed to the insulator, whereby the insulating conduit may be readily separated into sections without breaking the seals.

4. An insulating conduit of tubular formation for conveying compressed gas and having an inlet end and an outlet end, electrical insulation between said ends, said insulation comprising a plurality of insulating tubes each having a relatively large diameter toward the inlet end and a relatively small diameter toward the outlet end, the large end of each of said tubes concentrically overlapping the smaller end of the adjacent tube with an annular space between the overlapping portions, a plurality of metallic tubes each having a relatively large diameter toward the inlet end and a relatively small diameter toward the outlet end, the large diameter of each of said metallic tubes being placed concentrically around the large portion of each of said insulating tubes and sealed thereto, the smaller portion of each of said metallic tubes being placed concentrically inside the larger portion of each of said insulating tubes and sealed thereto, each of said insulating tubes having an integral skirt of insulating material at its larger end, the internal diameter of the smaller portion of each of said insulating tubes being substantially constant, and accordingly the internal diameter thereof being substantially the same in all of said insulating tubes, thereby providing a tubular conduit of substantially uniform diameter throughout its length, and a circumferential groove in the internal surface of said insulating tube, the cross section of said groove being such as to trap and hold drops of moisture which might run down the internal surface thereof.

5. An insulating conduit of tubular formation for conveying compressed gas and having an inlet and an outlet end, electrical insulation between said ends, said insulation comprising a plurality of insulating tubes each having a relatively large diameter toward the inlet end and a relatively small diameter toward the outlet end, the large end of each of said tubes concentrically overlapping the smaller end of the adjacent tube with an annular space between the overlapping portions, a plurality of metallic tubes each having a relatively large diameter toward the inlet end and a relatively small diameter toward the outlet end, the large diameter of each of said metallic tubes being placed concentrically around the large portion of each of said insulating tubes and sealed thereto, the smaller portion of each of said metallic tubes being placed concentrically inside the larger portion of each of said insulating tubes and sealed thereto, each of said insulating tubes having an integral skirt of insulating material at its larger end, the internal diameter of the smaller portion of each of said insulating tubes being substantially constant, and accordingly the internal diameter thereof being substantially the same in all of said insulating tubes, thereby providing a tubular conduit of substantially uniform inside diameter throughout its length, each of said insulating tubes at the inlet end of its smaller portion having a shoulder with a radial width approximately equal to the radial thickness of the insulator at its outlet end, and a gasket of resilient material placed between the shoulder and the end of the adjacent insulator, thereby preventing leakage of the compressed gas or entrance of moisture from outside, and a circumferential groove in the internal surface of said insulating tube, the cross section of said groove being such that its sides are inclined toward the outlet end of the conduit assembly.

6. An insulating conduit of tubular formation for conveying compressed gas and having an inlet end and an outlet end, electrical insulation between said ends, said insulation comprising a plurality of insulating tubes each having a relatively large diameter toward the inlet end and a relatively small diameter toward the outlet end, the large end of each of said tubes concentrically overlapping the smaller end of the adjacent tube with an annular space between the overlapping portions, a plurality of metallic tubes each having a relatively large diameter toward the inlet end and a relatively small diameter toward the outlet end, the large diameter of each of said metallic tubes being placed concentrically around the large portion of each of said insulating tubes and sealed thereto, the smaller portion of each of said metallic tubes being placed concentrically inside the larger portion of each of said insulating tubes and sealed thereto, each of said insulating tubes having an integral skirt of insulating material at its larger end, each of said insulating tubes being sealed to the adjacent metallic tubes only where the insulation lies between the overlapping portions of said metallic tubes, and the external and internal surfaces of said insulating tube lying between the overlapping portions of said metallic tubes and adjacent thereto being coated with a conducting film, the area of the conducting film being a maximum on the insulating tube at the live end of the conduit assembly and of progressively smaller area on the insulating tubes farther from the live end thereof, each of the conducting films being in electrical connection with the metallic tube in closest proximity to the film.

HUMPHREYS MILLIKEN.

REFERENCES CITED

The following references are of record in the file of this patent:

UNITED STATES PATENTS

| Number | Name | Date |
|---|---|---|
| 633,173 | Withycombe | Sept. 19, 1899 |
| 728,805 | Locke | May 19, 1903 |
| 1,077,711 | Hewlett | Nov. 4, 1913 |
| 1,198,131 | Jackson | Sept. 12, 1916 |
| 1,199,467 | Jackson | Sept. 26, 1916 |
| 1,526,023 | Steinberger | Feb. 10, 1925 |
| 1,905,751 | Rankin | Apr. 25, 1933 |

FOREIGN PATENTS

| Number | Country | Date |
|---|---|---|
| 157,470 | England | Jan. 27, 1921 |
| 460,732 | France | Oct. 13, 1913 |